United States Patent
Wieres

(10) Patent No.: US 6,436,551 B1
(45) Date of Patent: *Aug. 20, 2002

(54) HONEYCOMB BODY MADE OF SHEET-METAL LAYERS OF DIFFERENT INITIAL MATERIALS

(75) Inventor: Ludwig Wieres, Overath (DE)

(73) Assignee: EMITEC Gesellschaft fuer Emissionstechnologie mbH, Lohmar (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 853 days.

(21) Appl. No.: 08/756,349

(22) Filed: Nov. 26, 1996

Related U.S. Application Data

(63) Continuation of application No. PCT/EP95/01211, filed on Mar. 31, 1995.

(30) Foreign Application Priority Data

May 27, 1994 (DE) .......................................... 44 18 630

(51) Int. Cl.[7] ................................................ B01J 35/04
(52) U.S. Cl. .................. 428/593; 428/603; 502/527.22; 422/180
(58) Field of Search ................................ 428/593, 603, 428/180; 502/439, 527.22

(56) References Cited

U.S. PATENT DOCUMENTS

| | | | | |
|---|---|---|---|---|
| 5,102,743 A | * | 4/1992 | Maus et al. .................. | 428/593 |
| 5,422,083 A | * | 6/1995 | Sheller ......................... | 422/174 |
| 5,620,666 A | * | 4/1997 | Usui ............................ | 422/171 |

FOREIGN PATENT DOCUMENTS

| | | |
|---|---|---|
| DE | 88 12 924.1 | 1/1989 |
| DE | 88 01 788.5 | 7/1989 |
| EP | 0 217 493 A1 | 4/1987 |
| EP | 0 283 220 A1 | 9/1988 |
| WO | 89/07488 | 8/1989 |
| WO | 94/05424 | 3/1994 |
| WO | 914/22577 | 10/1994 |

* cited by examiner

Primary Examiner—John J. Zimmerman
(74) Attorney, Agent, or Firm—Laurence A. Greenberg; Werner H. Stemer; Gregory L. Mayback

(57) ABSTRACT

A honeycomb body of a catalytic reactor with channels through which a fluid can flow, in particular of a catalytic reactor for exhaust gases of an internal combustion engine of a motor vehicle, includes alternating essentially smooth and structured, and in particular corrugated, sheet-metal layers. At least one sheet-metal layer is formed from an initial material of greater thickness than the other layers. All of the smooth sheet-metal layers are produced from the same initial materials as one another. All of the structured sheet-metal layers are produced from the same initial materials as one another. The smooth sheet-metal layers and the structured sheet-metal layers are produced from initial materials having different thicknesses and/or properties from one another.

13 Claims, 1 Drawing Sheet

HONEYCOMB BODY MADE OF SHEET-METAL LAYERS OF DIFFERENT INITIAL MATERIALS

CROSS-REFERENCE TO RELATED APPLICATION

This application is a Continuation of International Application Serial No. PCT/EP95/01211, filed Mar. 31, 1995.

BACKGROUND OF THE INVENTION

Field of the Invention

The invention relates to a honeycomb body of a catalytic reactor with channels through which a fluid can flow, in particular of a catalytic reactor for exhaust gases of an internal combustion engine of a motor vehicle, including alternating essentially smooth and structured and in particular corrugated sheet-metal layers.

Honeycomb bodies of sheet-metal layers of the type referred to above are known, for instance, from International Patent Application WO 89/07488, corresponding to U.S. Pat. No. 5,102,743. In those honeycomb bodies, smooth and corrugated sheets, in stacks, are layered alternatingly on one another and intertwined. A few of the sheet-metal layers are constructed to be thicker than the others. The thicker sheet-metal layers serve to increase the strength of the stack, especially whenever the stack is inserted into a jacket tube.

However, preparing individual, different-thickness sheet-metal layers in the stack entails increased production costs.

In certain applications of a honeycomb body, the preparation of individual thicker sheet-metal layers to increase the strength is not needed. It is also fundamentally advantageous, for the sake of reducing the mass and expense of the honeycomb body, to make the sheet-metal layers as thin as possible. However, that objective contradicts the objective of high strength of the honeycomb body and long-term resistance to corrosion.

Summary of the Invention

It is accordingly an object of the invention to provide a honeycomb body made of sheet-metal layers of different initial or input materials, which overcomes the hereinafore-mentioned disadvantages of the heretofore-known devices of this general type, which has adequate strength and the least possible mass and which is also adequately resistant to corrosion at least under other than extreme conditions.

With the foregoing and other objects in view there is provided, in accordance with the invention, a honeycomb body of a catalytic reactor, in particular of a catalytic reactor for exhaust gases of an internal combustion engine of a motor vehicle, comprising alternating substantially smooth and structured, and in particular corrugated, sheet-metal layers defining channels therebetween through which a fluid can flow; at least one of the sheet-metal layers being formed of an initial material of greater thickness than the others of the sheet-metal layers; all of the smooth sheet-metal layers being produced from the same initial materials as one another, all of the structured sheet-metal layers being produced from the same initial materials as one another; the smooth sheet-metal layers and the structured sheet-metal layers being produced from initial materials having different thicknesses from one another; all of the smooth sheet-metal layers having a thickness of from 0.04 mm to 0.06 mm, preferably 0.05 mm, the structured sheet-metal layers having a thickness of from 0.025 mm to 0.045 mm, preferably 0.04 mm; and all of the structured sheet-metal layers being at least 0.005 mm and preferably 0.01 mm thinner than the smooth sheet-metal layers.

A honeycomb body according to the invention is made up of alternating essentially smooth and structured sheet-metal layers. The structured sheet-metal layers are preferably corrugated. As a result of the alternating configuration of essentially smooth and structured sheet-metal layers, channels are formed through which a fluid can flow. The honeycomb body is especially suitable as a catalytic reactor for exhaust gases of an internal combustion engine of a motor vehicle. For that purpose, the walls of the honeycombs of the honeycomb body have a catalytic coating, which is subjected to the flow of exhaust gases of the engine.

Precise investigations of the production process and the properties of such honeycomb bodies have shown that the essentially smooth and the corrugated sheet-metal layers have different tasks to perform and must meet different demands during manufacture and for the sake of the later properties of the honeycomb body. It is thus not absolutely correct to use the same initial material for both types of sheet-metal layers, as was conventionally done until now. In actuality, the essentially smooth sheets no longer need be cold-formed, and therefore in manufacture can have a greater hardness than the structured sheets. Different widths and/or thicknesses of the various types of sheet-metal layers are also possible, in order to properly perform the various tasks.

Conventionally, all of the sheet-metal layers of a honeycomb body have a certain, identical thickness, typically approximately 0.05 mm. In order to reduce the mass of the honeycomb body, in the present invention the thickness of all of the structured sheet-metal layers has been reduced. Since overall the stretched-out length of the structured sheet-metal layers is substantially greater than the length of the essentially smooth sheet-metal layers, this provision makes for a significant savings of material and therefore cost. Moreover, since the strength of the structure is determined primarily by the essentially smooth sheet-metal layers, the strength is only insignificantly reduced and to a tolerable extent, especially in the axial direction.

It is especially economical and favorable for the performance of the sheets in the manufacturing process if the structured sheets, but not the essentially smooth sheets, are soft-annealed. First, this saves manufacturing and energy costs for some of the sheet-metal layers. Second, the annealed sheets can be corrugated more easily, yet the smooth sheets assure the requisite stability when the final honeycomb body is inserted into a jacket tube. A similar effect is naturally obtained with thicker smooth sheet-metal layers or with a combination of these two options.

In accordance with another feature of the invention, the number of essentially smooth and structured sheet-metal layers is approximately equal. In other words, structured sheet-metal layers and essentially smooth sheet-metal layers alternate with one another.

In accordance with a further feature of the invention, the structured sheet-metal layers, transversely to the main structuring, have an additional structuring of the kind that is described, for instance, in Published European Patent Application 0 454 712 B1. This additional structuring has a substantially smaller amplitude than the main structuring and serves to make a fluid flowing through the honeycomb body turbulent, in order to improve the contact of the fluid with the walls of the honeycombs. In order to produce a metal sheet of a certain width, provided with this kind of transverse structuring, the starting material must have a somewhat larger width. In order to provide a honeycomb body in which the structured sheet-metal layers have a transverse structure but the essentially smooth sheet-metal layers do not, variously wide starting materials must therefore already be used for the smooth and the corrugated sheet-metal layers, so that the use of an additionally different thickness width does not entail any additional logistical expense. The thin sheets are also easier to transversely structure and corrugate, while the thicker smooth sheet-metal layers assure the strength of the honeycomb bodies.

In accordance with an added feature of the invention, the sheet-metal layers are wound around one another. This provision increases the strength of the honeycomb body without at the same time increasing the consumption of materials.

In accordance with an additional feature of the invention, the sheet-metal layers are wound in an S around one another. A thus-constructed honeycomb body can especially advantageously be fitted into a round or oval jacket tube.

In accordance with yet another feature of the invention, as an alternative, the sheet-metal layers may be disposed in a stack. This has the advantage of permitting an especially simple production process upon insertion of the honeycomb body into a jacket tube.

In accordance with a concomitant feature of the invention, the substantially smooth sheet-metal layers have a slight structuring with a substantially lower amplitude of structuring than the structured sheet-metal layers. This kind of structuring of the substantially smooth sheet-metal layers has essentially the same orientation as the structuring of the structured sheet-metal layers. This provision increases the elasticity of the honeycomb body, and because of the small amplitude of structuring, the advantage of economy of materials and the advantage of strength are essentially preserved. The structuring is preferably a corrugation, the periodicity of which may be adapted to the periodicity of the structured sheet-metal layers.

Other features which are considered as characteristic for the invention are set forth in the appended claims.

Although the invention is illustrated and described herein as embodied in a honeycomb body made of sheet-metal layers of different initial materials, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
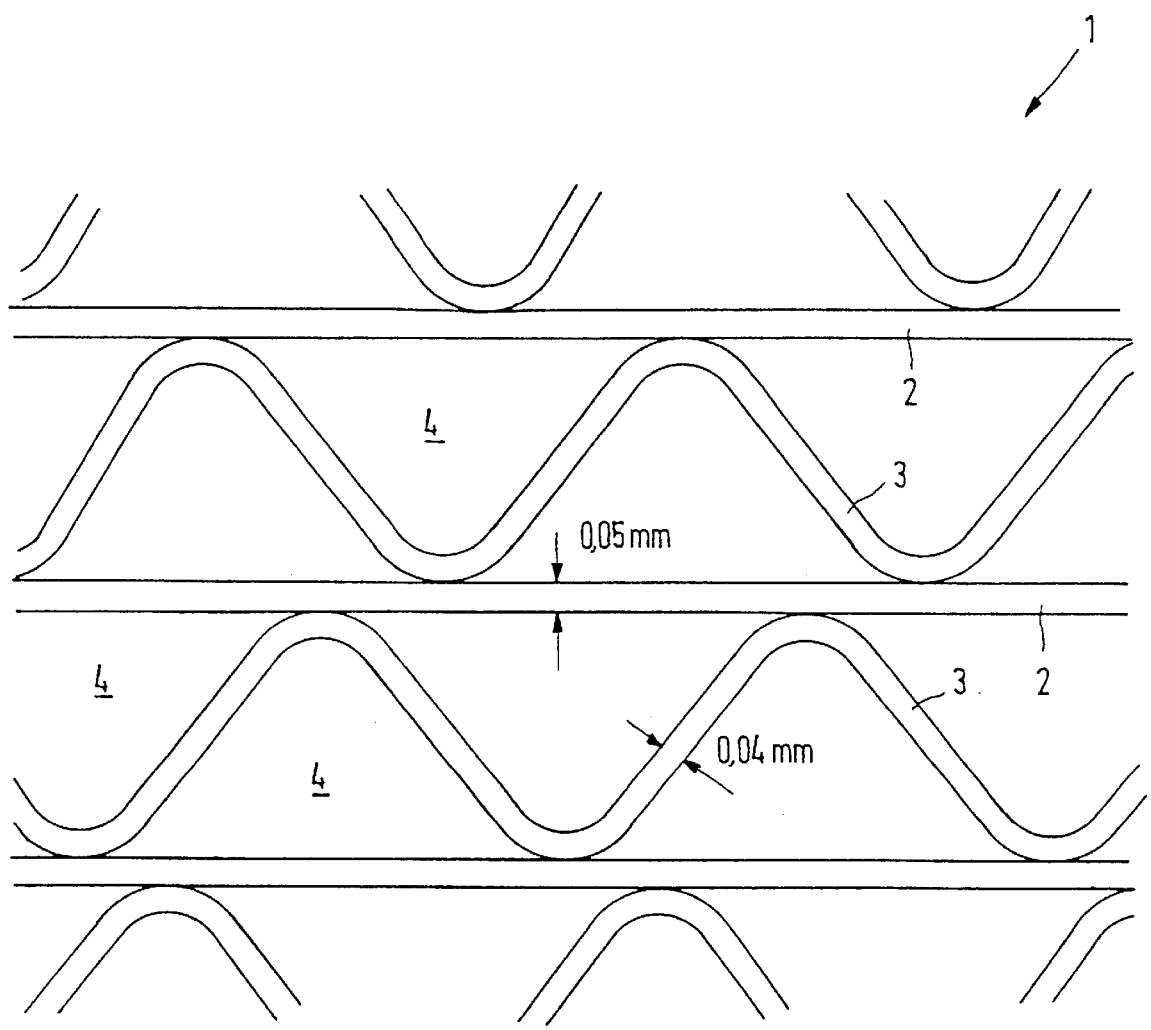
FIG. 1 is a fragmentary, diagrammatic, cross-sectional view of a honeycomb body according to the invention.

Referring now in detail to the single figure of the drawing, there is seen a portion of a cross section of a stack 1 of sheet-metal layers 2, 3. The stack 1 includes essentially smooth sheet-metal layers 2 and corrugated sheet-metal layers 3, which are disposed in alternation one above the other. As a result of this configuration, channels 4, through which a fluid can flow, are created between the smooth sheet-metal layers 2 and the corrugated sheet-metal layers 3. The flow direction is essentially at right angles to the plane of the drawing. In the preferred exemplary embodiment of the invention, the thickness of all of the smooth sheet-metal layers 2 is approximately 0.05 mm, and the thickness of all of the corrugated sheet-metal layers 3 is approximately 0.04 mm.

The stretched-out total length of the corrugated sheets 3 is approximately twice the total length of the smooth sheets 2. If the thickness of the corrugated sheet-metal layers 3 is reduced by approximately 20%, the resultant savings in weight of the overall honeycomb body is approximately 13%. The catalytically active surface of the honeycomb body, that is the total surface area of the honeycomb walls, remains essentially constant. In the most favorable case, the structural volume can even be reduced further, while the catalytically active surface area remains the same. The elasticity of the honeycomb body can be increased through the use of a slight corrugation of the smooth sheet-metal layers 2, while the possible extent of economy in materials drops only slightly.

Honeycomb bodies with a reduced thickness of the structured sheets in accordance with the invention, in particular in combination with a transverse structure of these sheets, are especially suitable for applications in which extreme corrosive strains do not occur. Such conditions exist, for instance, in catalytic converters in the United States, because of the motor vehicle speed limits as compared to elsewhere.

I claim:

1. A honeycomb body of a catalytic reactor, comprising:
    alternating substantially smooth and structured sheet-metal layers defining channels therebetween through which a fluid can flow;
    all of said smooth sheet-metal layers being produced from same initial materials as one another, all of said structured sheet-metal layers being produced from same initial materials as one another;
    all of said smooth sheet-metal layers having a thickness of from 0.04 mm to 0.06 mm, said structured sheet-metal layers having a thickness of from 0.025 mm to 0.045 mm; and
    all of said structured sheet-metal layers being at least 0.005 mm thinner than said smooth sheet-metal layers.

2. The honeycomb body according to claim 1, wherein said sheet-metal layers and said channels are part of a catalytic reactor for exhaust gases of an internal combustion engine of a motor vehicle.

3. The honeycomb body according to claim 1, wherein said structured sheet-metal layers are corrugated.

4. The honeycomb body according to claim 1, wherein all of said smooth sheet-metal layers have a thickness of 0.05 mm, and said structured sheet-metal layers have a thickness of 0.04 mm.

5. The honeycomb body according to claim 1, wherein all of said structured sheet-metal layers are 0.01 mm thinner than said smooth sheet-metal layers.

6. The honeycomb body according to claim 1, wherein said structured sheet-metal layers are structured in a given direction and have an additional microstructuring transverse to said given direction of said structuring.

7. The honeycomb body according to claim 1, wherein said structured sheet-metal layers and said smooth sheet-metal layers are approximately equal in number.

8. The honeycomb body according to claim 1, wherein said sheet-metal layers are wound around one another for adaptation to a peripheral cross section of an internal cross section of a jacket tube into which the honeycomb body is to be installed.

9. The honeycomb body according to claim 8, wherein said sheet-metal layers are wound around one another in an S.

10. The honeycomb body according to claim 1, wherein said sheet-metal layers are disposed in a stack.

11. The honeycomb body according to claim 1, wherein at least some of said smooth sheet-metal layers have a corrugation with a substantially smaller corrugation amplitude than said structured sheet-metal layers.

12. A honeycomb body of a catalytic reactor, comprising:

alternating substantially smooth and structured sheet-metal layers defining channels therebetween through which a fluid can flow;

said smooth sheet-metal layers and said structured sheet-metal layers being produced from initial materials having different thicknesses from one another; and all of said smooth sheet-metal layers having a thickness of substantially 0.05 mm, said structured sheet-metal layers having a thickness of substantially 0.04 mm.

13. A honeycomb body of a catalytic reactor, comprising:

alternating substantially smooth and structured sheet-metal layers defining channels therebetween through which a fluid can flow;

said smooth sheet-metal layers and said structured sheet-metal layers being produced from initial materials having different thicknesses from one another;

all of said smooth sheet-metal layers having a thickness of from 0.04 mm to 0.06 mm, said structured sheet-metal layers having a thickness of from 0.025 mm to 0.045 mm; and said structured sheet-metal layers having a thickness of about 20% less than the thickness of said smooth sheet-metal layers.

\* \* \* \* \*